United States Patent [19]

Doerffel et al.

[11] 4,170,580

[45] Oct. 9, 1979

[54] COATING COMPOSITION

[75] Inventors: Joerg Doerffel; Karl-Heinz Haneklaus, both of Marl, Fed. Rep. of Germany

[73] Assignee: Chemische Werke Hüls Aktiengesellschaft, Fed. Rep. of Germany

[21] Appl. No.: 830,275

[22] Filed: Aug. 31, 1977

[30] Foreign Application Priority Data

Sep. 4, 1976 [DE] Fed. Rep. of Germany ....... 2639967

[51] Int. Cl.$^2$ ..................... C08L 61/32; C08L 61/28; C08L 61/24
[52] U.S. Cl. ............................. 260/29.4 R; 528/254; 528/261
[58] Field of Search ................ 260/850, 29.4, 67.6 R; 528/254, 261

[56] References Cited

U.S. PATENT DOCUMENTS

| 3,267,174 | 8/1966 | Fry et al. | 260/856 |
| 3,862,072 | 1/1975 | Sekmakas | 260/850 |
| 3,922,447 | 11/1975 | Isaksen et al. | 260/850 |
| 4,129,681 | 12/1978 | Anderson et al. | 260/850 |

*Primary Examiner*—John C. Bleutge
*Attorney, Agent, or Firm*—Millen & White

[57] ABSTRACT

A coating composition which comprises a binder consisting of a mixture of a polyester with an aminoplast, a low-molecular weight precursor of said aminoplast or a mixture thereof; water; an organic auxiliary solvent; and optional conventional adjuvants; wherein the auxiliary solvent consists of 10–100% by weight of 1,4-bis (hydroxymetyl)cyclohexane. When baked, the cyclohexane compound is incorporated into the resultant coating.

7 Claims, No Drawings

COATING COMPOSITION

BACKGROUND OF THE INVENTION

This invention relates to coating compositions comprising a mixture of a binder consisting of a mixture of a polyester with an aminoplast and/or a low-molecular weight precursor thereof, water, a monomolecular alcohol as the auxiliary solvent, and, optionally, conventional adjuvants.

Water-dilutable coating compositions containing the aforementioned binders are known (DAS [German Published Application] 1,805,189). This reference also describes the additional use of auxiliary solvents for the purpose of improvement of solubility respectively dilutability.

DOS (German Unexamined Laid-Open Application) 2,253,300 describes monomolecular diols as auxiliary solvents for nonaqueous coating compositions which are low in solvent and/or free of solvent. In this connection, the diol utilized has the effect of a "reactive diluent" since it is chemically incorporated into the binder during the baking step. However, experiments have shown that this incorporation does not take place for such diols in the case of aqueous varnish systems. As a result, the advantages which are derived from such chemical binding of the auxiliary solvent are lost for aqueous systems inasmuch as the organic components, in addition to water, become volatile during the baking step. Consequently, the auxiliary solvent vaporizes causing deleterious environmental air pollution effects.

On the other hand, other types of "reactive diluents" are also known for aqueous systems. For example, DOS 2,439,548 describes monomeric caprolactam as the reactive diluent. However, the nature of the incorporation of this compound into the coating during the baking process is still inadequate.

SUMMARY OF THE INVENTION

Accordingly, it is an object of the present invention to provide an auxiliary solvent which is effective when present in minimum amounts, this solvent being incorporated into the baked coating and, desirably, even further improving the properties of the coating.

This object has been attained by providing otherwise conventional aqueous coating compositions wherein the auxiliary solvent comprises 1,4-bis(hydroxymethyl)cyclohexane.

DETAILED DESCRIPTION 1,4-Bis(hydroxymethyl)cyclohexane can be utilized in this invention in either the cis-form or the trans-form or as a mixture of both forms. The cis-trans-mixture is preferably employed.

The coating compositions of this invention are of the conventional water-dilutable type and are made up of conventional polyesters and aminoplasts. Especially suitable polyesters include those having a molecular weight of 800–3,000 and acid numbers of about 40–80 mg. KOH/g., as well as hydroxyl numbers of at least the same order of magnitude. The polyesters can be linear or branched. Oil-modified polyesters can likewise be utilized. The molecular weight referred to herein is the number average molecular weight as measured by osmotic pressure.

Suitable aminoplasts include those described in the Journal Paint Manufacture, April 1974, p. 8–10, whose disclosure is incorporated by reference.

Such binders are described, for example, in DAS's 1,805,188 (U.S. Pat. No. 3,691,258); 1,805,189; 2,013,097; 2,013,702; or 2,225,646. Oil-modified binders are disclosed for example, in DAS 1,495,244 or 1,519,146. The auxiliary solvent of this invention is particularly suitable for use in coating compositions made up of water-soluble polyesters containing 1,4-bis(hydroxymethyl)cyclohexane and aminoplasts in accordance with DAS 1,805,189.

The weight ratio of polyester to the aminoplast can vary between 50:50 and 90:10.

The coating compositions generally have a solids content of 30–60% by weight, preferably 40–50% by weight and contain water as the primary solvent or diluent. The amount of binder in the composition is 20–60% by weight, preferably 25–50% by weight.

The auxiliary solvent is contained in the coating composition in amounts of 1–25% by weight, preferably 3–15% by weight. Of this amount, from 10 to 100% by weight, preferably from 33–66% by weight, consists of 1,4-bis(hydroxymethyl)cyclohexane. Any required additional solvent comprises other conventional auxiliary solvents, such as alcohols, glycol ethers, esters, ketones, or ketone alcohols, or mixtures thereof.

Typical conventional adjuvants include pigments, flow agents and the like. These are generally present in the composition in amounts of 0 to 150% by weight, preferably 50 to 100% by weight (pigments-according to the binder) respectively 0.01 to 1% by weight, preferably 0.05 to 0.5% by weight (flow agent-according to the coating composition). The balance of the composition is composed of the solvent/diluent water. Of course, preparation of the novel coating composition of this invention and its application to a desired surface is fully conventional.

An essential advantage of the auxiliary solvent of this invention derives from the fact that for the first time a reactive diluent can be fully incorporated in the baked coating even for aqueous varnish systems. Consequently, the non-polluting characteristics of water-dilutable varnish systems is greatly enhanced.

By utilizing the auxiliary solvent of this invention, it is furthermore made possible to improve the shelf-life of the resultant coating compositions and to reduce the sedimentation tendency of the pigments. The resistance to running of the freshly applied coating composition on vertical surfaces is likewise improved. Furthermore, the pigmented coating compositions of this invention generally have higher solids contents at a given processing viscosity.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever. In the following Examples, the temperatures are set forth uncorrected in degrees Celsius; unless otherwise indicated, all parts and percentages are by weight.

The commercially available extensively methyletherified hexamethylolmelamine, alkyd resin solution and high solids polyesters referred to throughout the Examples are respectively MAPRENAL ® MF 900

(melamine), HYDROLID® RE 40 (alkyd resin) and VESTURIT® BL 1211 (polyester).

EXAMPLES
Polyester I 519 g. of 1,4-bis(hydroxymethyl)cyclohexane, 161 g. of trimethylolpropane, 249 g. of phthalic anhydride, and 280 g. of adipic acid are heated, while passing a gentle nitrogen steam through the mixture, to 150° C. for 2 hours and then to 200° C. for 28 hours. The resultant polyester having an acid number of 4.7 mg. KOH/g. is cooled to 130° C. and after adding 142 g. of phthalic anhydride, left for another 1.5 hours at this temperature. The thus-formed acidic polyester has an acid number of 46 and a hydroxyl number of 113 mg. KOH/g.

Polyester II

In accordance with the above mode of operation, a polyester having an acid number of 45 and a hydroxyl number of 97 KOH/g. is prepared from 605 g. of 1,4-bis(hydroxymethyl)cyclohexane, 134 g. of trimethylolpropane, 311 g. of phthalic anhydride, and 277 g. of adipic acid, as well as 148 g. of phthalic anhydride for purposes of acidifying.

Polyester III

A polyester having an acid number of 50 and a hydroxyl number of 51 mg. KOH.g. is prepared from 864 g. of 1,4-bis(hydroxymethyl)cyclohexane, 268 g. of trimethylolpropane, 592 g. of phthalic anhydride, and 438 g. of adipic acid, as well as 296 g. of phthalic anhydride for acidification.

Polyester IV

In a single stage, an acidic polyester having an acid number of 60 and hydroxyl number of 95 mg. KOH/g. is prepared from 527 g. of ethylene glycol, 313 g. of glycerin, 1133 g. of phthalic anhydride, and 744 g. of adipic acid.

EXAMPLE 1

833 g. of polyester I was dissolved in 84 g. of 1,4-bis(hydroxymethyl)cyclohexane and 83 g. of n-butanol. 50 g. of a commercially available, extensively methyletherified hexamethylolmelamine was added to 180 g. of the 83.3% polyester solution. Thereafter, the mixture was neutralized under agitation with 11.1 g. of N,N-dimethyl-aminoethanol and, after about 30 minutes, diluted with 159 g. of water. The resultant clear varnish contained 50% by weight of binder.

EXAMPLES A through K 833 g. of polyester I was mixed with 84 g. of the auxiliary solvents listed in Table 1 and 83 g. of n-butanol to obtain an 83.3% solution. Clear varnishes were then prepared as described in Example 1.

Table 1 represents the relative change in solids content of the baked-in clear varnish, determined by experiment, in dependence on the respectively utilized auxiliary solvent. Examples A and B serve as reference specimens, wherein the solids content of the coatings as determined is assumed to be 100%. The greater the extent to which an auxiliary solvent is incorporated into the baked coating, the higher the percentage of the solids content above 100%, and/or the larger the relative change of the solids content.

To determine the solids content in the baked-in coating, the clear varnish (1.0–1.5 g.) was weighed into a small aluminum dish (diameter 55 mm.) and baked for 30 minutes at 160° C.

Tables 2 and 3 contain the results of measurements of the viscosities of the clear varnishes as a function of binder contents and of the Pendulum Hardness H of the baked coatings, respectively.

TABLE 1
Relative Change in Solids Content of a Baked-In Coating

| Example | Auxiliary Solvent | Relative Change [%] |
|---|---|---|
| A | n-Butanol | [Reference Test] |
| B | Ethyl glycol | [Reference Test] |
| C | Ethylene glycol | 0 |
| D | 1,4-Butanediol | 0 |
| E | Neopentyl glycol | 0 |
| F | 1,1'-Isopropylidene-bis(p-phenylene-oxy)-dipropanol-(2) | 6.1 |
| G | x,8-Bis(hydroxymethyl)-tricyclo[5,2,1,0$^{2,6}$]-decane (x = 3, 4, and 5)* | 5.8 |
| H | Polyethylene glycol (MW = 2,000) | 5.9 |
| J | Polyester** | 7.5 |
| K | Caprolactam | 2.2 |
| 1 | 1,4-Bis(hydroxymethyl)-cyclohexane | 6.0 |

*Mixture of isomers
**Commercial binder of a high-solid varnish (acid number: <1 mg. KOH/g.; OH-number: 170 mg. KOH/g.)

TABLE 2
Viscosity Characteristic of the Clear Varnishes with Differing Binder Contents

| | | Viscosity* [mPa s] at a Binder Content of [% by Weight]** | | |
|---|---|---|---|---|
| Example | Auxiliary Solvent | 50 | 45 | 40 |
| A | n-Butanol | 1,250 | 1,00 | 840 |
| B | Ethyl glycol | 2,600 | 2,300 | 1,300 |
| F | 1,1'-Isopropylidene-bis(p-phenylene-oxy)dipropanol-(2) | 6,800 | 6,400 | 4,700 |
| G | x,8-Bis(hydroxymethyl)tricyclo-[5,2,1,0$^{2,6}$]-decane (x = 3,4, and 5) (see Table 1) | 4,100 | 3,900 | 3,500 |
| H | Polyethylene glycol | 6,00 | 5,800 | 1,200 |
| J | Polyester (see Table 1) | 8,050 | 6,700 | 4,450 |
| K | Caprolactam | 3,700 | 3,450 | 1,860 |
| 1 | 1,4-Bis(hydroxymethyl)cyclohexane | 4,300 | 3,100 | 1,050 |

*Determination took place in a rotary viscometer at 20° C.
**Dilution to the final concentration by adding further amounts of water to the starting solution.

TABLE 3
Pendulum Hardness H (DIN 53 157) of the Clear Varnishes Baked for 30 Minutes at 150° C.

| Example | Auxiliary Solvent | H [sec.] |
|---|---|---|
| A | n-Butanol | 158 |
| B | Ethyl glycol | 167 |
| F | 1,1'-Isopropylidene-bis-(p-phenylene-oxy)dipropanol-(2) | 198 |
| G | x,8-Bis(hydroxymethyl)tri-cyclo[5,2,1,0$^{2,6}$]decane (x = 3, 4, and 5) (see | 211 |

TABLE 3-continued

Pendulum Hardness H (DIN 53 157) of the
Clear Varnishes Baked for 30 Minutes at 150° C.

| Example | Auxiliary Solvent (Table 1) | H [sec.] |
|---|---|---|
| H | Polyethylene glycol | 38 |
| J | Polyester (see Table 1) | 111 |
| K | Caprolactam | 159 |
| 1 | 1,4-Bis(hydroxymethyl)cyclohexane | 199 |

All coatings have elasticity values (DIN [German Industrial Standard] 53 156) of 10-11 mm.

EXAMPLE 2

833 g. of polyester II was dissolved in 84 g. of 1,4-bis(hydroxymethyl)cyclohexane and 83 g. of n-butanol. A varnish paint was prepared from the 83.3% strength polyester solution in accordance with the following recipe:

25.2 g. Polyester solution
1.57 g. Dimethylaminoethanol
5.75 g. Almost completely methylated hexamethylolmelamine
22.9 g. $TiO_2$ (rutile)
0.35 g. Silicone resin solution (50% in butyl glycol)
44.23 g. Water The resultant varnish paint (viscosity: 61 seconds—DIN 4 mm/23° C.) was flawlessly applied by means of a spray gun and showed good resistance against running on vertical surfaces. The tendency of the pigment toward sedimentation was extremely minor.

EXAMPLE L 833 g. of polyester II was dissolved in 167 g. of n-butanol. A pigmented varnish paint was prepared analogously to Example 2. To obtain the same viscosity as in Example 2, another 8.7 g. of water was added. The tendency of the pigments toward sedimentation and the running resistance on vertical surfaces was significantly poorer than in Example 2.

TABLE 4

Storage Stability (45° C.) and Mechanical Properties of Pigmented Coatings

| Example | Storage Stability [Days]* | Baking Conditions [°C./min.] | Pendulum Hardness** [sec.] | Deep Drawability (***) [mm.] |
|---|---|---|---|---|
| 2 | 45 | 140/30 | 126 | 10 |
|   |    | 150/30 | 154 | 9.2 |
|   |    | 160/30 | 188 | 9.0 |
| L | 24 | 140/30 | 88  | 10 |
|   |    | 150/30 | 113 | 9.4 |
|   |    | 160/30 | 140 | 8.5 |

*Testing took place in sealed vessels. The end point of storage stability was reached when the resin precipitated from the solution.
**DIN 53 157
***DIN 53 156

EXAMPLE 3

A polyester solution was prepared from 200 g. of polyester III, 20 g. of 1,4-bis(hydroxymethyl)cyclohexane, and 44 g. of n-butanol. After adding 73.3 g. of a commercial, extensively methyl-etherified hexamethylolmelamine, the mixture was neutralized with 16.0 g. of N,N-dimethylaminoethanol. The clear varnish resulting after addition of 233.3 g. of water yielded, after one-half hour of curing at 120° C., a smooth, glossy coating having the following mechanical properties:

Pendulum hardness (DIN 53 157): 130 seconds
Deep drawability (DIN 53 156): 10.5 mm.

EXAMPLE 4

A polyester solution of 100 g. of polyester IV, 10 g. of n-butanol, and 10 g. of 1,4-bis(hydroxymethyl)cyclohexane was combined with 33.3 g. of an extensively methyl-etherified hexamethylolmelamine and then neutralized with 10.8 g. of triethylamine and diluted with water to a binder content of 50% by weight. The clear varnish, baked at 160° C./30 minutes had the following characteristics:

Pendulum hardness (DIN 53 157): 118 seconds
Deep drawability (DIN 53 156): >10 mm.
Solids content of the baked-in coating: 49.5% by weight

EXAMPLE M

A polyester solution of 100 g. of polyester IV and 20 g. of n-butanol was processed as described in Example 4. The resultant coating had the following properties:

Pendulum hardness (DIN 53 157): 85 seconds
Deep drawability (DIN 53 156): >10 mm.
Solids content of the baked-in coating: 46.3% by weight

EXAMPLE 5

Under vacuum, 55% of the solvent was withdrawn from a 65% alkyd resin solution in butyl glycol (water-dilutable product available commercially): this proportion of solvent was replaced by 1,4-bis(hydroxymethyl)cyclohexane. Thereafter, an extensively methyl-etherified hexamethylolmelamine was added thereto (alkyd resin/aminoplast ratio 3:1). The mixture was neutralized with triethylamine and subsequently diluted with water to a binder content of 50% by weight. The clear varnish was baked at 170° C. for 30 minutes. The thus-obtained film had the following properties:

Pendulum hardness (DIN 53 157): 95 seconds
Deep drawability (DIN 53 156): 5.2 mm.
Solids content of the baked-in coating: 56.6% by weight

EXAMPLE N

The aminoplast was added directly to the same commercially available alkyd resin solution as used in Example 5; this mixture was neutralized as described in Example 5, diluted, and baked. After the baking step, a transparent coating was obtained having the following properties:

Pendulum hardness (DIN 53 157): 79 seconds
deep drawability (DIN 53 156): 5.8 mm.
Solids content of the baked-in coating: 48.7% by weight The experiments denoted by letters are not in accordance with this invention. All quantitative data and percentages relate to weight.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modification of the invention to adapt it to various usages and conditions .

What is claimed is:

1. In a coating composition which comprises a binder consisting of a mixture of 50-90 percent of weight of a polyester with 50-10 percent of weight of an aminoplast, a low-molecular weight precursor of said aminoplast or a mixture thereof; said polyester having a number average molecular weight of 800-3,000 and an acid number of about 40-80 mg. KOH/g, as well as a hydroxyl number of at least the same order of magnitude; water;
  1-25 percent by weight of the total composition of an auxiliary organic solvent; and
  optional conventional adjuvants;
  the improvement wherein said auxiliary solvent consists essentially of 10-100% by weight of the total amount of auxiliary solvent of 1,4-bis(hydroxymethyl)-cyclohexane.

2. The coating composition of claim 1 wherein said auxiliary solvent consists essentially of 33-66% by weight of 1,4-bis(hydroxymethyl)cyclohexane.

3. The coating composition of claim 1 wherein the amount of said binder is 20-60% by weight.

4. The coating composition of claim 1 wherein said 1,4-bis(hydroxymethyl)cyclohexane is a mixture of the cis- and trans- forms thereof.

5. The coating composition of claim 3 wherein said 1,4-bis(hydroxymethyl)cyclohexane is a mixture of the cis- and trans- forms thereof.

6. A coated substrate whose coating consists essentially of a composition of claim 1 baked thereon.

7. A method of coating a composition onto a substrate whereby the running of the coating and the emanation of pollutants from the coating are minimized, which consists essentially of employing as the coating composition, a coating composition of claim 1.

* * * * *